US007584973B2

(12) United States Patent
Brager

(10) Patent No.: US 7,584,973 B2
(45) Date of Patent: Sep. 8, 2009

(54) MULTILEVEL TOOL TREE

(76) Inventor: Steve Brager, 6929 Highland View Dr., Arlington, WA (US) 98223

( * ) Notice: Subject to any disclaimer, the term of this patent is extended or adjusted under 35 U.S.C. 154(b) by 154 days.

(21) Appl. No.: 11/635,412

(22) Filed: Dec. 7, 2006

(65) Prior Publication Data

US 2008/0136132 A1 Jun. 12, 2008

(51) Int. Cl.
*B62B 3/00* (2006.01)
*A47B 9/00* (2006.01)

(52) U.S. Cl. ................ 280/47.35; 280/79.11; 280/79.3; 280/635; 280/35; 248/127; 248/161; 248/404; 248/415; 211/70.6; 211/85.8; 269/16; 269/17; 269/76; 269/45; 108/141

(58) Field of Classification Search ............. 280/47.35, 280/79.11, 79.3, 638, 35; 248/127, 161, 248/404, 415; 211/70.6, 85.8; 269/16, 17, 269/76, 45; 108/141
See application file for complete search history.

(56) References Cited

U.S. PATENT DOCUMENTS 732,227 A * 6/1903 Shafer et al. .................. 108/66
1,049,668 A * 1/1913 Carlson et al. ................ 108/96
2,819,938 A * 1/1958 Zerver ........................ 312/201
2,831,582 A * 4/1958 Cody ......................... 108/141
3,665,867 A * 5/1972 Carlson et al. ................ 108/25
3,735,958 A * 5/1973 Hollingsworth ............. 254/2 R
3,774,773 A * 11/1973 Brent ........................ 211/70.6
3,776,387 A * 12/1973 Brent ........................ 211/70.6
4,572,595 A * 2/1986 Craig ......................... 312/305
4,688,686 A * 8/1987 Mitts et al. .................. 211/183
4,826,007 A * 5/1989 Skeie ......................... 206/373
5,379,885 A * 1/1995 Chen .......................... 206/216
5,494,346 A * 2/1996 Domenig .................... 312/238
6,082,269 A * 7/2000 Padberg ....................... 108/44
6,105,768 A * 8/2000 Brown ........................ 206/373
6,360,891 B1 * 3/2002 Rideout ...................... 206/373
6,626,305 B2 * 9/2003 Domenig et al. ............ 211/144
6,755,466 B1 * 6/2004 Anders .................... 297/217.7
6,883,439 B1 * 4/2005 Moore ........................ 108/147
6,883,887 B1 * 4/2005 Mogensen .................. 312/408
6,905,020 B2 * 6/2005 Chang ........................ 206/373
2002/0074471 A1 * 6/2002 Domenig et al. ............ 248/238
2005/0194873 A1 * 9/2005 Hoffman .................... 312/305

* cited by examiner

*Primary Examiner*—Christopher P Ellis
*Assistant Examiner*—Jacob Meyer

(57) ABSTRACT

A system for the storage and convenient presentation of tools or other items is disclosed. Specifically, the invention disclosed is a multilevel tool lift which consists of a base assembly, a substantially vertical tube assembly and shelf assemblies attached to the substantially vertical tube assembly. The substantially vertical tube assembly can be extended or contracted, thereby raising and lowering the shelf assemblies attached thereto.

11 Claims, 5 Drawing Sheets

MULTILEVEL TOOL TREE

CROSS REFERENCE TO RELATED APPLICATIONS

None

STATEMENT REGARDING FEDERALLY SPONSORED RESEARCH OR DEVELOPMENT

The invention disclosed in this application was not the subject of federally sponsored research or development.

FIELD

This invention is related to the storage of tools or small items; more particularly, this invention pertains to a system by which a wide variety of tools or small items can be stored yet remain conveniently available for use when needed.

BACKGROUND

Since the time when human beings first developed tools, a convenient way to organize and store the tools needed to perform a specific task has been a necessity. Prior art methods of organizing and storing tools are numerous including bags, belts, pails, etc. Some tool users keep their tools in boxes. Early tool boxes were made of wood. While these wooden tool boxes enabled tools to be kept in a single location and protected, wooden tool boxes did not present a convenient way to organize tools so that the tool required at a particular time could be easily identified and located. Many tools were simply dumped into a box and the person needing a specific tool had to rummage through all of the tools in the box or selectively remove tools one by one until the right tool was found for the job at hand.

The development of sophisticated manufacturing techniques has enabled low cost tools of all shapes and sizes to be made available to users. However, with more tools available to users the problem of storing and organizing all of the tools in a user's possession is exacerbated.

To this day, many tool boxes simply include a removable tray sized to fit into the top of a tool box. By using the removable tray, smaller hand tools such as wrenches and screwdrivers can be separated from larger, less frequently used tools such as hammers and pipe wrenches. These larger tools are typically stored in the bottom of the tool box. For the sophisticated builder, car mechanic or repairman, a tool box with a simple tray insert is insufficient to organize all the different types of tools that might be necessary to complete a job. Moreover, a mechanic with a large collection of different tools will have a difficult time finding the right tool for the job in a tool box having only a top tray, thereby wasting valuable time and energy.

To organize and hold the many tools used by a mechanic, builder or repairman, chest-type metal tool boxes were developed. These prior art chest-type tool boxes can be from three feet to six feet in height. In each chest-type tool box are a number of different sized drawers into which even the heaviest tools can be placed for storage and protection. Some of these prior art tool boxes are made to be movable by the use of casters. However, large prior art chest-type tool boxes are too big to fit into tight spaces and cannot be rolled into spaces with a low overhead such as underneath a car or a truck. Moreover, the tools in chest-type tool boxes are stored inside the drawers, out of sight from the mechanic. Unless the mechanic has memorized the drawer location for each tool, the mechanic must open each drawer and then examine the contents of each drawer to find the right tool. This effort to find the right tool for a job requires the mechanic to leave a job in progress, walk over to the tool box and locate the right tool.

What is needed in the art is a tool organizing system which can be moved alongside a workman to the job site that will provide easy access to a large selection of tools. In addition, the tool organizing system should be able to fit in tight spaces as well as spaces with a low overhead and still present needed tools to the mechanic so that the mechanic does not have to dig through an unorganized pile of tools to find the right tool for the task at hand.

SUMMARY

The disclosed tool organizing system of the present invention provides a mechanism for the convenient storage of tools and presentation of the tools to a mechanic, a builder or a repairman at the job site. Further, the disclosed tool organizing system can be used in tight spaces or in spaces with a low overhead.

The disclosed invention is a "tool tree" or tool lift which includes one or more shelf assemblies onto which individual tools or small items such as replacement parts or fasteners can be placed. Each tool on the tool lift is in open view and readily obtainable. The shelf assemblies are rotatably mounted so that tools on the far side of the shelf assembly from the mechanic can be easily accessed by rotating the shelf assembly in either direction to where the needed tool or small item is within easy reach of the user. Individual shelf assemblies can be removed leaving only those shelf assemblies holding the tools or small items which are needed. Accordingly, the tool lift of the present invention will fit under a car, thus making it possible for a mechanic to have access to all the tools or small items needed to do the work needed without having to crawl out from under the car and retrieve a needed tool from a tool box. Further, the shelf assemblies can be raised to the desired height for work or lowered to a compact shape for storage by use of a centrally mounted substantially vertical cylinder assembly which can be extended pneumatically, hydraulically, electrically or mechanically.

BRIEF DESCRIPTION OF THE DRAWING FIGURES

A better understanding of the multilevel tool lift system of the present invention may be had by review of the drawing figures wherein.

DESCRIPTION OF THE EMBODIMENTS

Figure 1:
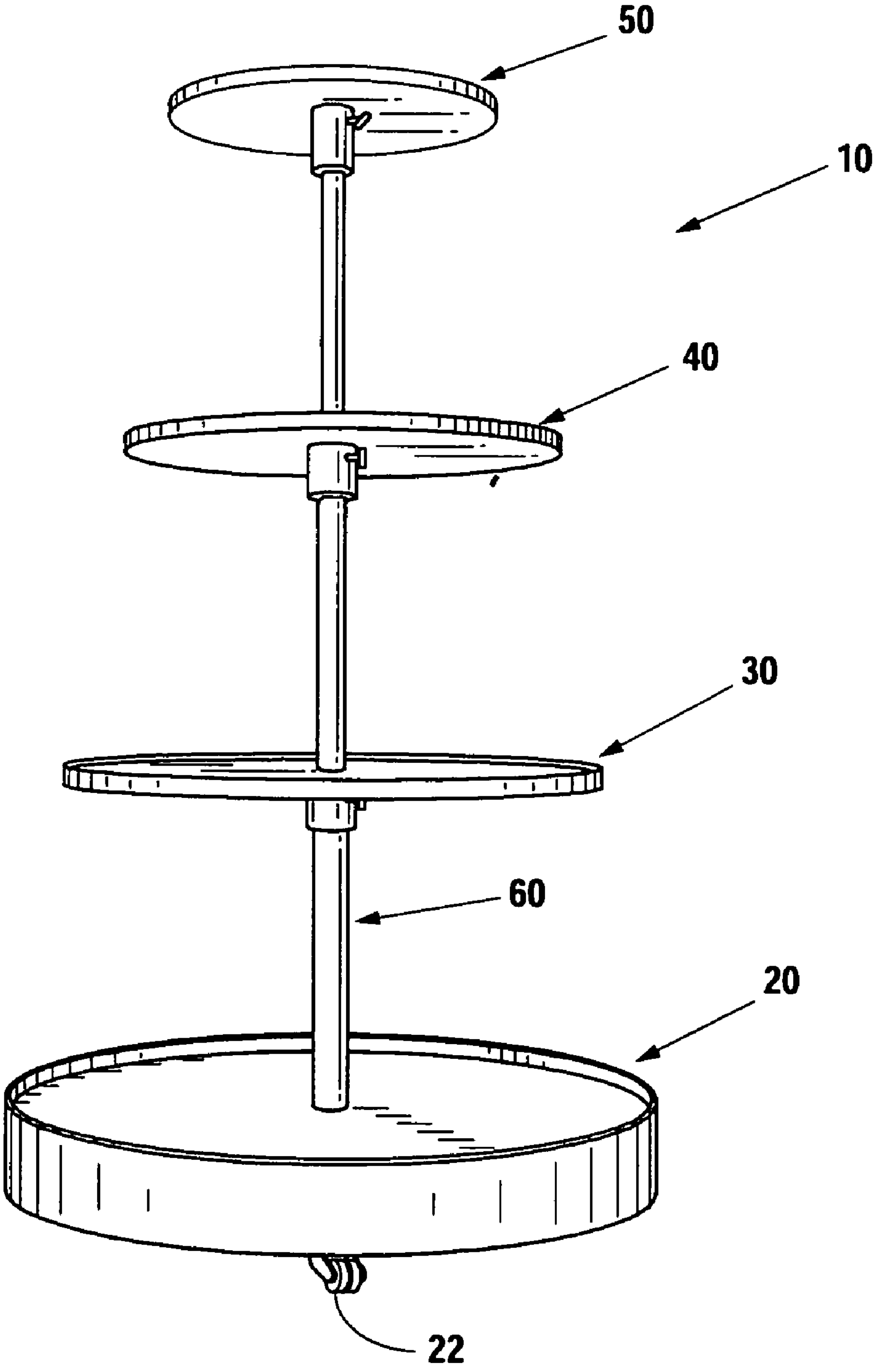
FIG. 1 is a perspective view from the front of the multilevel tool lift in an extended configuration.

The multilevel tool lift 10 disclosed in the instant application and as shown in FIG. 1 is a system for the storage of tools. The multilevel tool lift 10 consists of a base assembly 20 which both supports the tool lift 10 and provides a mounting for the wheels 22 by which the multilevel tool lift 10 may be moved from one location to another. The base assembly 20 also may house either an air tank, a tank of hydraulic fluid, an electric motor or a hand-operated mechanical gear drive assembly 60 or the like to extend a substantially vertical cylinder assembly 60.

The substantially vertical cylinder assembly 60 may be a pneumatic substantially vertical cylinder, a hydraulic cylinder, an electrically-extended substantially vertical cylinder or mechanically-extended substantially vertical cylinder. The purpose of the cylinder assembly 60 is to raise the multilevel tool lift 10 to its full height. Surrounding the substantially vertical telescoping cylinder assembly 60 and attached thereto are a plurality of shelf assemblies 30, 40, and 50. In the preferred embodiment, the shelf assemblies 30, 40 and 50 diminish in radius in inverse relationship with the height of the multilevel tool lift 10 with the largest shelf located at the base assembly 20 of the multilevel tool lift 10. If desired the horizontal surfaces on each shelf assembly may be magnetized or covered with a magnetic material to keep metal tools or small items in place. Alternatively, the horizontal surface may also be covered with a replaceable tacky surface to keep non-metal tools or small items in place.

The substantially vertical telescoping cylinder assembly 60 may be extended using either air or hydraulic fluid pressurized by an electrical or foot-operated pump. The substantially vertical telescoping cylinder 60 may also be extended using an electric motor using available electrical power or by a rechargeable battery. Alternatively, the telescoping cylinder may be extended by the use of a hand crank or a foot pedal.

In addition to storage and organizing tools at home, at a repair shop or on an assembly line, the multilevel tool lift 10 can also be used to store replacement parts and/or fasteners and make them convenient for use by a construction or assembly technician. A smaller version of the multilevel tool lift 10 may be used as a desktop organizer for office supplies or as an organizer in the kitchen for cooking utensils. The multilevel tool lift 10 could also be used in a hospital or other medical setting. In an operating room many different types of tools, instruments and supplies could be stored on the tool lift 10 making these tools, instruments and supplies readily available and convenient for access by all of the healthcare providers during either a surgical or some other type of medical procedure. In an emergency room, bandages, drugs and instruments stored on the multilevel tool lift 10 would be at the fingertips of the doctors, nurses or technicians caring for a patient. The medical equipment could be kept clean and secure by use of the cover which is attachable to the tool lift 10. Pilfering of supplies or controlled substances stored on the tool lift 10 could be prevented by locking the cover to the base assembly 20 of the multilevel tool lift 10. Those of ordinary skill in the art will recognize that the multilevel tool lift 10 of the present invention could be made in many sizes and that there are many uses for the disclosed multilevel tool lift 10.

The basic structure and organization of the tool lift 10 disclosed in the instant application is shown in FIG. 1. Attached to the base assembly 20 are three or more caster wheel assemblies 22 which facilitate movement of the tool lift 10. Not shown but well known to those of ordinary skill in the art is either an air tank, hydraulic fluid tank, electric motor or crank assembly which is housed in the base assembly 20 and would be used to raise the substantially vertical tube assembly 60 to selected heights.

Attached to the substantially vertical tube assembly 60 is a lower shelf assembly 30, a middle shelf assembly 40 and an upper shelf assembly 50. In the preferred embodiment each shelf assembly 30, 40, and 50 is formed as a disk. For stability, particularly when heavy objects are stored, the size of each disk becomes progressively smaller in diameter as the shelf assemblies 30, 40, and 50 are positioned away from the base assembly 20. While disks are shown in the preferred embodiment other shapes for the shelf assemblies such as triangles, squares, rectangles, pentagons, hexagons or octagons may be used. FIG. 1 shows the tool tree 10 in its extended mode; but, as will be explained below the tool lift 10 may be collapsed by the shortening of the substantially vertical tube assembly 60.

Figure 2:
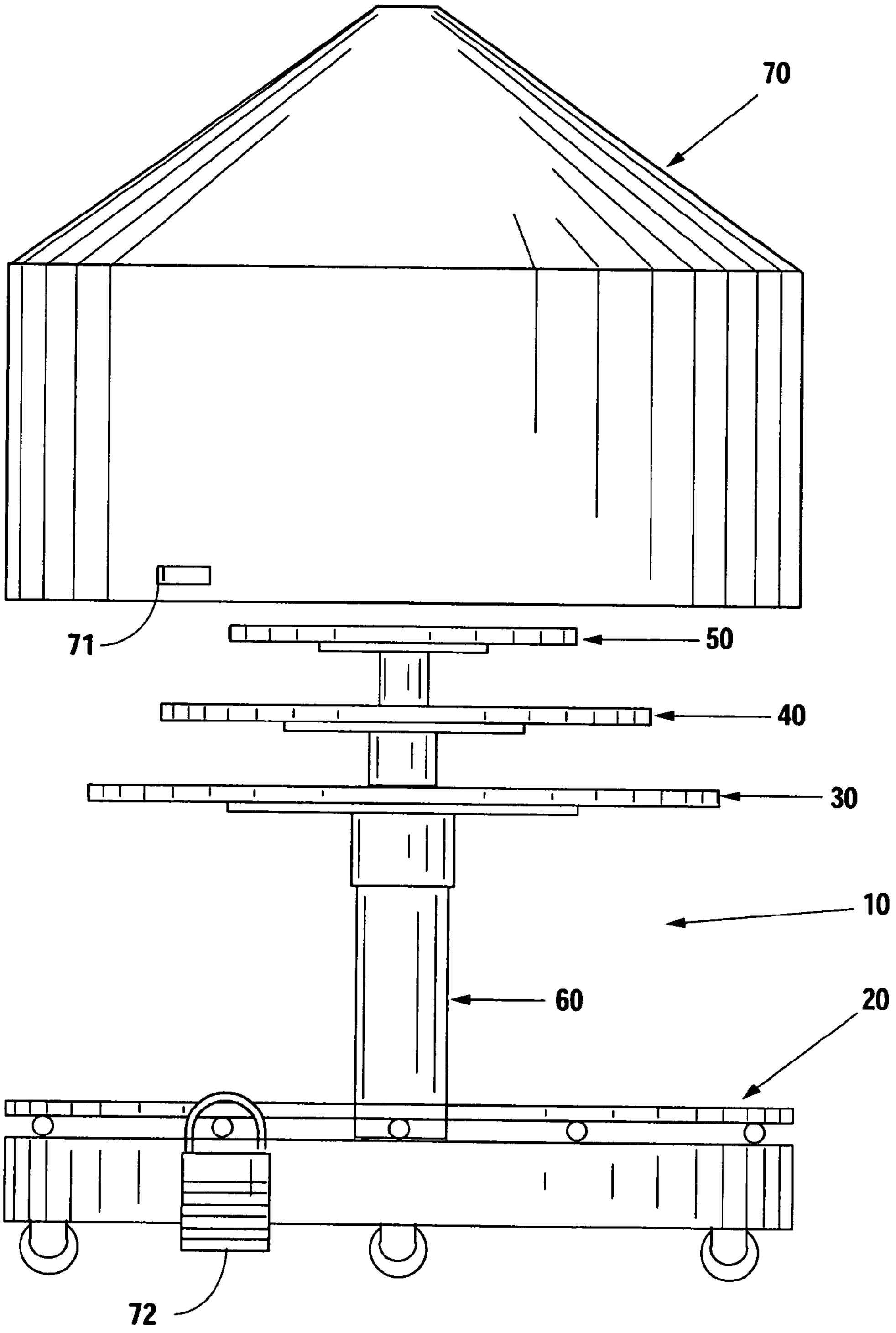
FIG. 2 is a elevational view of the multilevel tool lift in a collapsed configuration with a cover.

FIG. 2 illustrates the multilevel tool lift 10 in its compressed mode. As previously explained, the substantially vertical tube assembly 60 may be extended using a variety of different methods well known to those of ordinary skill in the art. The substantially vertical tube assembly 60 to which the shelf assemblies 30, 40, 50 are all attached can be easily lowered by gravity so that the cover assembly 70 can be placed over the tools in the multilevel tool lift 10. The cover assembly 70 can be secured to the base assembly 20 of the tool lift 10 by a lock 72 which fits through a slot 71 on the cover 70 and attaches the cover 70 to the base assembly 20. This provides security for the tools stored on the tool lift 10 and prevents dust and debris from collecting on the tools when not in use.

Figure 3:
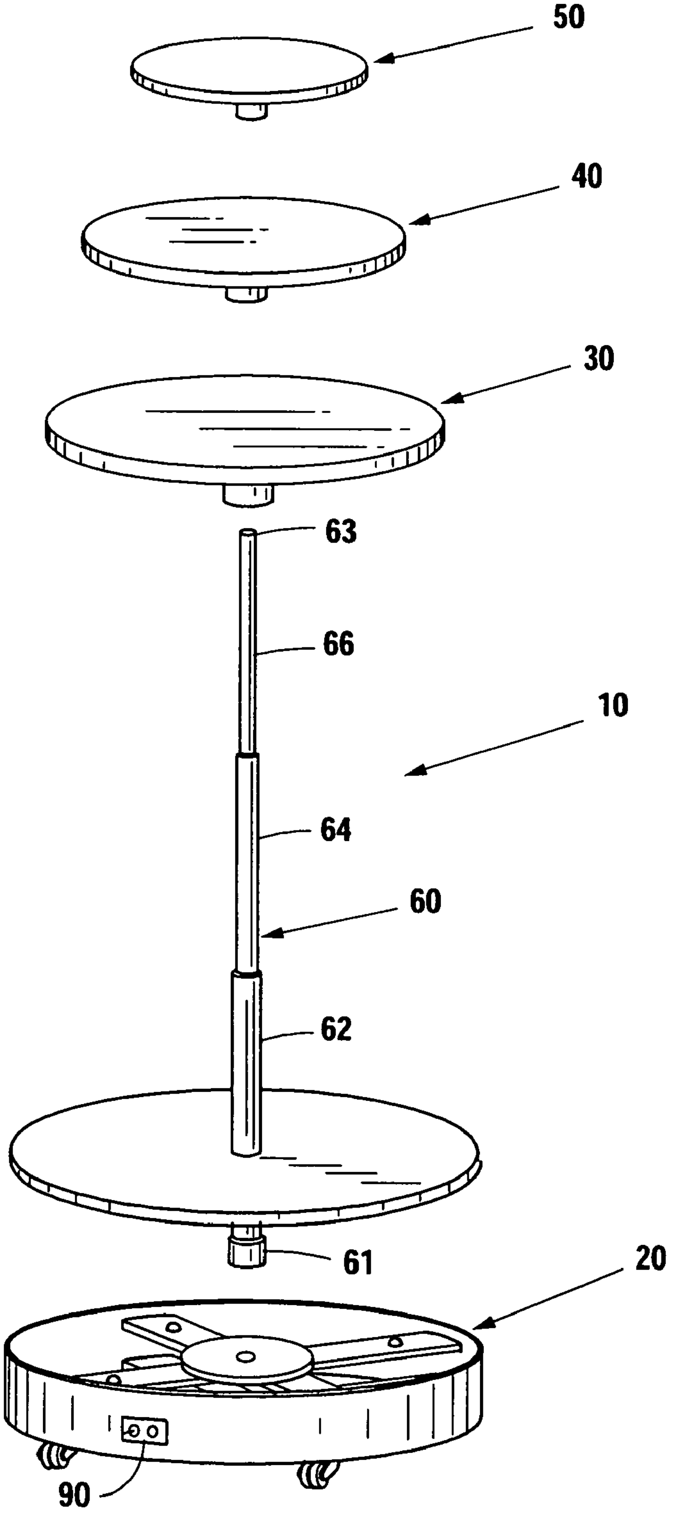
FIG. 3 is an exploded perspective view of the multilevel lift.

An exploded view of the tool lift 10 is shown in FIG. 3. Therein it may be seen that shelf assemblies 30, 40, and 50 rest on different sections 62, 64, and 66 of the substantially vertical cylinder assembly 60 respectively.

Figure 4:
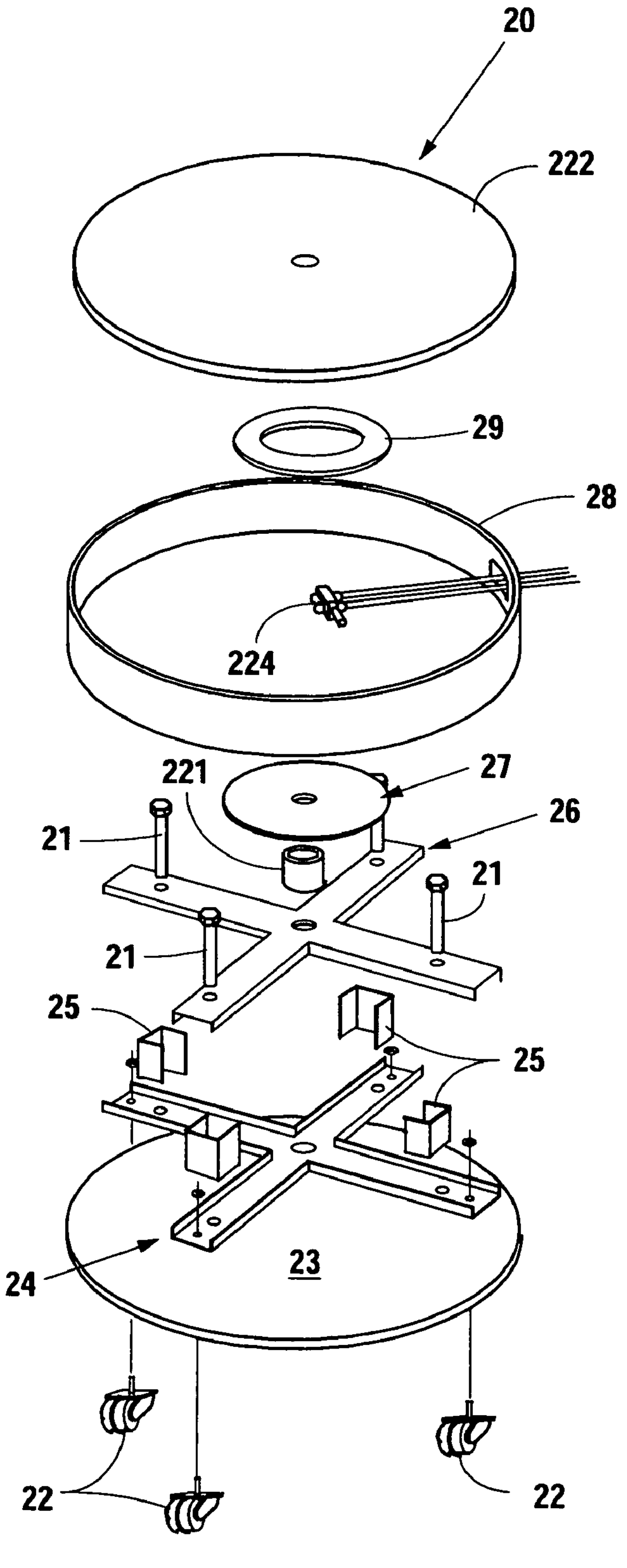
FIG. 4 is an exploded perspective view of the base assembly.

FIG. 4 shows the component parts of the base assembly 20. Wheels 22 are attached to the base bottom 23 with threaded fasteners through a lower base cross member assembly 24. Attached to the lower cross member assembly 24 are four base vertical supports 25. Threaded fasteners 21 are used to attach four vertical supports 25 to the upper base cross member assembly 26. A support collar 221 and a support plate 27 are attached to the center of the upper base cross member assembly 26. A substantially circular wall 28 is attached to the lower cross member assembly 26. A load bearing turntable 29 rests atop support plate 27. A disk shaped shelf 222 rests on the turntable 29. A connection assembly 224 for connection to a source of pressurized air, for example, is attached to the substantially circular wall 28 wrap 28. While pressurized air is used in the preferred embodiment because of its availability in most shops, connection assembly 224 could be replaced with connections for hydraulic fluid, electrical connections, or a socket for a hand crank or foot pedal.

Figure 5:
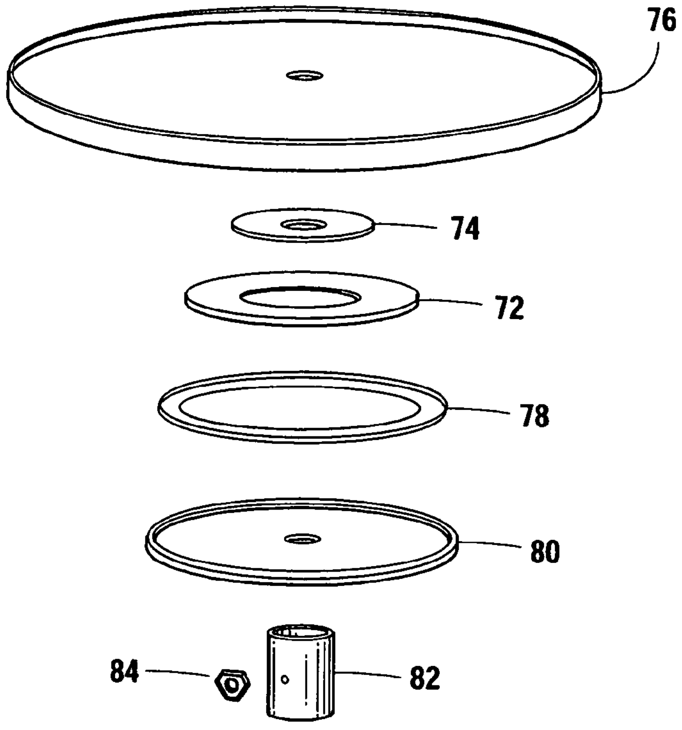
FIG. 5 is an exploded perspective view of a shelf assembly.

The design and construction of shelf assemblies 30, 40, and 50 is shown in FIG. 5. A load bearing turntable 72 is first attached to a shelf centering plate 74 and then to the substantially disk-shaped shelf 76 with threaded fasteners. Bearing centering ring 78 is attached to a bottom plate 80 by threaded fasteners. The bottom plate 80 is connected to a tubular support piece 82. A threaded fastener with a handle knob 84 is attached to the tubular support 82 to prevent unwanted rotation of the shelf assembly about the telescoping cylindrical assembly 60.

Referring back to FIG. 3, the bottom end 61 of the substantially vertical tube assembly 60 is attached to the base assembly 20. The top end 63 of the substantially vertical tube assembly 60 is attached in the preferred embodiment to the top shelf assembly 50. The middle shelf assembly 40 is attached to the middle section 64 of the substantially vertical tube assembly 60 underneath the top shelf assembly 50. The lower shelf assembly 30 is attached to the lower section 62 of the substantially vertical tube assembly 60 underneath the middle shelf assembly 40. In the preferred embodiment of the multilevel tool lift 10, the substantially vertical tube assembly 60 has three sections on which three shelf assemblies are attached. Those of ordinary skill in the art will recognize that substantially vertical tube assemblies 60 with fewer than three extensions or more than three extensions are also possible. Each shelf assembly is made to be independently rotatable around the substantially vertical cylinder assembly 60. The substantially vertical tube assembly 60 is extended or contracted as needed.

Figure 6:
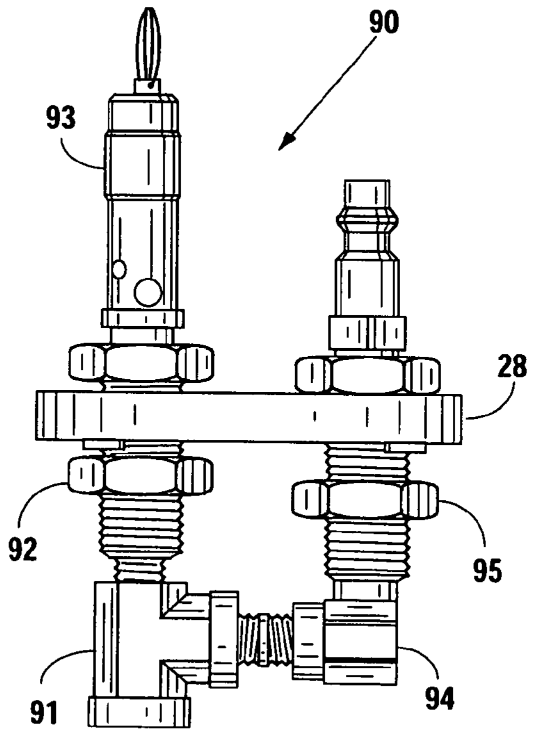
FIG. 6 is a top plan view of a pneumatic connection assembly.

In the preferred embodiment of the disclosed invention, the substantially vertical tube assembly 60 is raised pneumatically using a pneumatic connection assembly 90 shown in FIG. 6. The substantially vertical tube assembly 60 is connected to a pneumatic hose (not shown). At the other end of the pneumatic hose is the assembly of control valves 90 which connected to the base assembly 20 as shown in FIG. 3. The pneumatic hose is connected to the control assembly by a T fitting 91. The T fitting 91 is connected to a threaded coupling 92 which extends through the substantially circular wall surrounding the base assembly 20. Attached to the threaded coupling 92 on the outside of the wall 28 is a safety valve 93.

The T fitting 91 is also connected to an elbow connector 94. The elbow connector 94 is connected to another threaded coupling 95 which extends through the wall 28. Attached to threaded mount coupling 95 on the outside of the wall is a male coupling 96 to permit attachment to a source of air.

The multilevel tool lift of the present invention is provided to a user without tools. It is thereby up to the user to arrange the tools or small items on the tool lift according to his/her personal preference. Some users may want smaller tools near the top and larger tools or items near the bottom. Others may arrange tools or items so that tools or items needed at a higher level are on the top and tools or items needed at a lower level are on the bottom. As previously indicated, the tools or items may be held on the shelf assemblies using magnetic force or a tacky surface. Those of ordinary skill in the art will realize that the surfaces of the shelf assemblies may be divided into sections and include colored surfaces to distinguish certain sizes of tools one from another; e.g. English and metric.

Others of ordinary skill in the art will understand that the shelf assemblies may be automatically rotated around the substantially vertical tube assembly using a remote control similar to that used with a television set. Still others of ordinary skill will understand that lights may be placed on the shelf assemblies to enable the user to better identify needed tools in dark spaces. In yet another embodiment a cover for the shelf assembly may include special pockets sized to hold certain tools or item so that the absence of a tool or item can be quickly noticed.

Persons of ordinary skill in the art will recognize that there exist other embodiments of the invention which is the subject of this application which are not specifically disclosed in the specification. Those other embodiments to be included within by the scope and meaning of the appended claims.

I claim:

1. A multilevel tool lift for the storage and presentation of tools comprising:

a turntable base assembly;

said turntable base assembly including a shelf surface constructed and allowed for the storage and presentation of tools;

a substantially vertical tube assembly mounted on said base assembly;

a plurality of shelf assemblies constructed and arranged for the storage and presentation of tools, said plurality of shelf assemblies attached to said substantially vertical tube assembly;

whereby individual ones of said shelf assemblies may be raised or lowered with respect to said turntable base assembly by extending or contracting said substantially vertical tube assembly.

2. The multilevel tool lift defined in claim 1 wherein said substantially vertical tube assembly is extended or contracted pneumatically.

3. The multilevel tool lift defined in claim 1 wherein said individual ones of said plurality of shelf assemblies rotate independently with respect to the other said plurality of shelf assemblies about the substantially vertical tube assembly.

4. The multilevel tool lift defined in claim 1 wherein said plurality of shelf assemblies have a magnetized surface to prevent metal tools from moving around.

5. The multilevel tool lift defined in claim 1 wherein the shape of individual ones of said plurality of shelf assemblies may be selected from a group consisting of: disks, triangles, squares, rectangles, pentagons, hexagons and octagons.

6. The multilevel tool lift defined in claim 1 wherein said turntable base assembly is fitted with wheels to permit movement of said multilevel tool tree.

7. A system for the storage and presentation of items for use by a repairman or a construction technician, said system comprising:

a turntable base assembly; said turntable base assembly including a shelf surface constructed and arranged for the storage and presentation of tools;

a substantially vertical tube assembly attached to said turntable base assembly;

a plurality of shelf assemblies constructed and arranged for the storage and presentation of tools rotatably connected to said substantially vertical tube assembly;

a cover to provide cleanliness and security for the items stored on said shelf assemblies;

whereby individual ones of said shelf assemblies may be raised or lowered with respect to said turntable base assembly by extending or contracting said substantially vertical tube assembly.

8. The system for the storage and presentation of items as defined in claim 7 wherein said turntable base assembly is fitted with wheels to permit movement from one job site to another.

9. The system for the storage and presentation of items as defined in claim 7 wherein said substantially vertical tube assembly is extended or contracted pneumatically.

10. The system for the storage and presentation of tools as defined in claim 7 wherein the shape of said shelf assemblies may be selected from a group consisting of: disks, triangles, squares, rectangles, pentagons, hexagons and octagons.

11. The system for the storage and presentation of items as defined in claim 7 wherein said shelf assemblies have a magnetized surface to prevent metal items from sliding.

* * * * *